(12) United States Patent
Rowlands et al.

(10) Patent No.: US 11,689,644 B2
(45) Date of Patent: *Jun. 27, 2023

(54) PROCESSING DATA IN A NETWORK

(71) Applicant: Novatiq Technologies Limited, Cwmbran (GB)

(72) Inventors: Andrew Rowlands, Cardiff (GB); Krishna Sarma, Cathays (GB)

(73) Assignee: Novatiq Technologies Limited, Cwmbran (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,881

(22) Filed: Oct. 26, 2022

(65) Prior Publication Data

US 2023/0071514 A1 Mar. 9, 2023

Related U.S. Application Data

(63) Continuation of application No. 17/393,894, filed on Aug. 4, 2021, now Pat. No. 11,516,317, which is a
(Continued)

(30) Foreign Application Priority Data

Feb. 20, 2019 (GB) ...................... 1902309

(51) Int. Cl.
*H04L 69/08* (2022.01)
*H04L 67/02* (2022.01)
(Continued)

(52) U.S. Cl.
CPC .............. *H04L 69/08* (2013.01); *H04L 67/02* (2013.01); *G06F 21/60* (2013.01); *G06Q 30/0277* (2013.01)

(58) Field of Classification Search
None
See application file for complete search history.

(56) References Cited

U.S. PATENT DOCUMENTS 7,769,818 B2 * 8/2010 Yoshihara .............. G06Q 90/00
709/213
7,925,697 B2 4/2011 Futa et al.
(Continued)

FOREIGN PATENT DOCUMENTS

EP 1316901 A2 6/2003
WO 2004061608 A2 7/2004
(Continued)

OTHER PUBLICATIONS

International Search Report and Written Opinion dated Jun. 9, 2020 for PCT Application No. PCT/GB2020/050394.
(Continued)

*Primary Examiner* — Quang N Nguyen
(74) *Attorney, Agent, or Firm* — EIP US LLP

(57) ABSTRACT

A method of processing data in a network is disclosed. The method comprises transmitting, from a first server to a second server, first information characterising a first predefined format according to which first data is stored at a first data store; obtaining, at the second server, mapping information characterising a mapping of the first predefined format onto a second predefined format different to the first predefined format; generating, at the second server, based on the first information and the mapping information, second information for converting data in the first predefined format into data in the second predefined format; transmitting, from the second server to the first server, the second information; and parsing, at the first server, using the second information,
(Continued)

the first data stored at the first data store, to generate data in the second predefined format. Apparatuses are also disclosed.

19 Claims, 4 Drawing Sheets

Related U.S. Application Data continuation of application No. PCT/GB2020/050394, filed on Feb. 19, 2020.

(51) Int. Cl.
    *G06Q 30/0241*     (2023.01)
    *G06F 21/60*     (2013.01)

(56) References Cited

U.S. PATENT DOCUMENTS

| | | | |
|---|---|---|---|
| 8,473,636 B2 | 6/2013 | Kodama | |
| 10,154,007 B1 | 12/2018 | Viswanathan | |
| 10,348,864 B2 | 7/2019 | He | |
| 2002/0107985 A1 | 8/2002 | Hwang | |
| 2008/0243891 A1 | 10/2008 | Super et al. | |
| 2008/0243901 A1 | 10/2008 | Super et al. | |
| 2009/0150238 A1 | 6/2009 | Marsh et al. | |
| 2011/0113101 A1* | 5/2011 | Ye | G06Q 10/10 709/205 |
| 2012/0310899 A1 | 12/2012 | Wasserman et al. | |
| 2015/0256790 A1 | 9/2015 | Priest | |
| 2018/0063076 A1 | 3/2018 | Field | |
| 2021/0051215 A1* | 2/2021 | Yang | G06F 9/505 |
| 2022/0208320 A1 | 6/2022 | Bhograj et al. | |

FOREIGN PATENT DOCUMENTS

| | | |
|---|---|---|
| WO | 2007047310 A2 | 4/2007 |
| WO | 2009067461 A1 | 5/2009 |
| WO | 2018059026 A1 | 4/2018 |

OTHER PUBLICATIONS

Combined Search and Examination Report dated Aug. 20, 2019 for GB Application No. GB 1902309.2.

* cited by examiner

PROCESSING DATA IN A NETWORK

CROSS-REFERENCE TO RELATED APPLICATIONS

This application is a continuation of U.S. patent application Ser. No. 17/393,894, filed Aug. 4, 2021, which is a continuation of International Application No. PCT/GB2020/050394, filed Feb. 19, 2020 which claims priority to GB Application No. GB1902309.2, filed Feb. 20, 2019, under 35 U.S.C. § 119(a). Each of the above-referenced patent applications is incorporated by reference in its entirety.

BACKGROUND OF THE INVENTION

Technical Field

The present invention relates to a method, apparatus and system for processing data in a network.

Background

A service provider network, such as a Mobile Network Operator (MNO) network or an Internet Service Provider (ISP) network, acts as a gateway between a subscriber user device and a wider network, such as the public internet. The service provider stores data on the subscribers of the service provider. This data is stored within the private service provider network and is proprietary to the service provider. The data may include subscriber attributes (e.g. Date of Birth) and associated attribute values (e.g. Day/Month/Year). The subscriber data could be useful, for example for third parties in targeting content at specific segments of the subscriber population, but free access to this data by such third parties is restricted or not permitted for reasons of data security and/or protection. Providing a system that, for example, allows for the implementation of enhanced content delivery within the constraints of data security and/or protection is technically challenging.

The format in which subscriber data is stored may differ between different service providers. For example, the set, syntax, and/or ordering of subscriber attributes recorded at one service provider may be different to the set, syntax and/or ordering of subscriber attributes recorded at another service provider. Moreover, the format of the subscriber attributes and/or attribute values on the basis of which a third party may require to target content at specific segments of the subscriber population, may be different to the format in which those subscriber data are stored at a given service provider. This presents technical challenges to, for example, the efficient implementation of enhanced content delivery in such systems.

SUMMARY

According to a first aspect of the present invention, there is provided a method of processing data in a network, the network comprising a first server and a second server, the first server having access to a first data store storing first data according to a first predefined format, the method comprising: transmitting, from the first server to the second server, first information characterising the first predefined format according to which the first data is stored at the first data store; obtaining, at the second server, mapping information characterising a mapping of the first predefined format onto a second predefined format different to the first predefined format; generating, at the second server, based on the first information and the mapping information, second information for converting data in the first predefined format into data in the second predefined format; transmitting, from the second server to the first server, the second information; and parsing, at the first server, using the second information, the first data stored at the first data store, to generate data in the second predefined format.

Optionally, the method comprises, when the first information is updated at the first server and/or the mapping information is updated at the second server: transmitting, from the first server to the second server, the updated information and/or obtaining the updated mapping information; generating updated second information based on the updated first information and/or the updated mapping information; transmitting, from the second server to the first server, the updated second information; and parsing, at the first server, using the updated second information, the first data stored at the first data store, to generate data in an updated second predefined format.

Optionally, the transmitting, from the second server to the first server, the second information or updated second information, comprises the first server fetching the second information from second server.

Optionally, the first server fetches the second information from the second server periodically.

Optionally, the first predefined format comprises a first plurality of attributes each associated with first attribute values, and the second predefined format comprises a second plurality of attributes each associated with second attribute values.

Optionally, the mapping information comprises information characterising a mapping of the first plurality of attributes onto the second plurality of attributes and/or a mapping of the first attribute values onto the second attribute values.

Optionally, the first information further characterises a selected range of the first plurality of attributes.

Optionally, the generated second information comprises said second information corresponding to the selected range of the first plurality of attributes.

Optionally, the parsing comprises parsing the first data corresponding to the selected range of first attributes, to generate the data in the second predefined format.

Optionally, the method further comprises: obtaining, at the second server, segmentation information characterising one or more second attribute values on the basis of which the data in the second predefined format is to be segmented; transmitting, from the second server to the first server, the segmentation information; and at the first server, segmenting the data in the second predefined format based on the segmentation information, thereby to produce a segmentation output.

Optionally, transmitting the segmentation information from the second server to the first server comprises the first server fetching the segmentation information from the second server.

Optionally, the method comprises, when the segmentation information is updated at the second server: obtaining, at the second server, the updated segmentation information; transmitting, from the second server to the first server, the updated segmentation information; and at the first server, segmenting the data in the second predefined format based on the updated segmentation information, thereby to produce an updated segmentation output.

Optionally, the method comprises transmitting, from the first server, the segmentation output to a third server for the third server to use in modifying one or more messages received at the third server.

Optionally, the method comprises, at the third server, modifying a message based on the segmentation output.

Optionally, the modifying comprises including a content identifier into the message, the content identifier identifying content to be delivered in response to the message.

Optionally, the third server is an Internet Content Adaption Protocol, ICAP, Server.

Optionally, the first server and the first data store are located within a secure network and the second server is external to the secure network and does not have access to the first data store.

Optionally, the secure network is a secure network of a mobile network operator.

According to a second aspect of the present invention there is provided a system for processing data in a network, the system comprising a first server and a second server, the first server having access to a data base storing first data according to a first predefined format, the system being configured to: transmit, from the first server to the second server, first information characterising the first predefined format according to which the first data is stored at the first data store; obtain, at the second server, mapping information characterising a mapping of the first predefined format onto a second predefined format different to the first predefined format; generate, at the second server, based on the first information and the mapping information, second information for converting data in the first predefined format into data in the second predefined format; transmit, from the second server to the first server, the second information; and parse, at the first server, using the second information, the first data stored at the first data store, to generate data in the second predefined format.

According to a third aspect of the present invention, there is provided a method of processing data in a network, the network comprising a first server and a second server, the first server having access to a first data store storing first data according to a first predefined format, the method comprising, at the first server: transmitting, to the second server, first information characterising the first predefined format according to which the first data is stored at the first data store; receiving, from the second server, second information for converting data in the first predefined format into data in a second predefined format different to the first predefined format, the second information having been generated at the second server based on the first information transmitted to the second server and mapping information characterising a mapping of the first predefined format onto the second predefined format; and parsing, using the second information, the first data stored at the first data store, to generate data in the second predefined format.

According to a fourth aspect of the present invention, there is provided a method of processing data in a network, the network comprising a first server and a second server, the first server having access to a first data store storing first data according to a first predefined format, the method comprising, at the second server: receiving, from the first server, first information characterising the first predefined format according to which the first data is stored at the first data store; obtaining mapping information characterising a mapping of the first predefined format onto a second predefined format different to the first predefined format; generating, based on the first information and the mapping information, second information for converting data in the first predefined format into data in the second predefined format; transmitting, to the first server, the second information for the first server to use to parse the first data stored at the first data store to generate data in the second predefined format.

Optionally, the network comprises a further first server, the further first server having access to a further first data store, the further first data store storing further first data according to a further first predefined format; wherein the method comprises, at the second server: receiving, from the further first server, further first information characterising the further first predefined format according to which the further first data is stored at the further first data store; generating, based on the further first information and the mapping information and/or further mapping information generated on the basis of the further first information, further second information for converting data in the further first predefined format into data in the second predefined format; transmitting, to the further first server, the further second information for the further first server to use to parse the further first data stored at the further first data store to generate data in the second predefined format.

According to a fifth aspect of the present invention, there is provided apparatus for processing data in a network, the apparatus being a first server of the network, the network further comprising a second server; the first server having access to a first data base storing first data according to a first predefined format, the apparatus being configured to: transmit, to the second server, first information characterising the first predefined format according to which the first data is stored at the first data store; receive, from the second server, second information for converting data in the first predefined format into data in a second predefined format different to the first predefined format, the second information having been generated at the second server based on the first information transmitted to the second server and mapping information characterising a mapping of the first predefined format onto the second predefined format; and parse, using the second information, the first data stored at the first data store, to generate data in the second predefined format.

According to a sixth aspect of the present invention, there is provided apparatus for processing data in a network, the apparatus being a second server of the network, the network further comprising a first server, the first server having access to a first data base storing first data according to a first predefined format, the second server being configured to: receive, from the first server, first information characterising the first predefined format according to which the first data is stored at the first data store; obtain mapping information characterising a mapping of the first predefined format onto a second predefined format different to the first predefined format; generate, based on the first information and the mapping information, second information for converting data in the first predefined format into data in the second predefined format; transmit, to the first server, the second information for the first server to use to parse the first data stored at the first data store to generate data in the second predefined format.

According to a sixth aspect of the present invention, there is provided a computer readable storage medium having instructions stored thereon which, when executed by a computer cause the computer to perform the method of the third or fourth aspect.

Further features and advantages of the invention will become apparent from the following description of preferred examples of the invention, given by way of example only, which is made with reference to the accompanying drawings.

DETAILED DESCRIPTION OF CERTAIN INVENTIVE EMBODIMENTS

Figure 1:
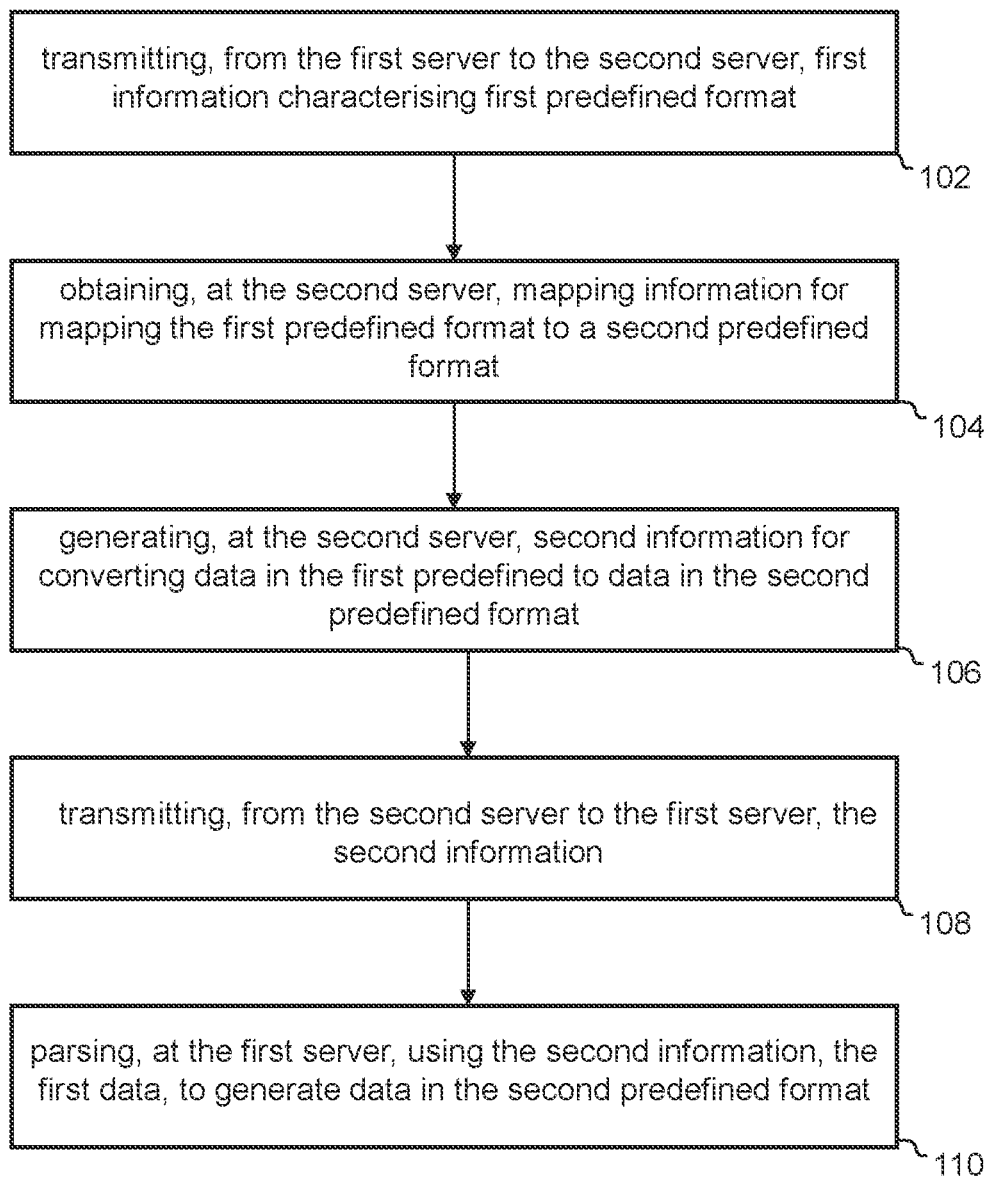
FIG. 1 is a flow diagram illustrating schematically a method according to an example.

FIG. 1 illustrates schematically a method of processing data in a network.

Figure 2:
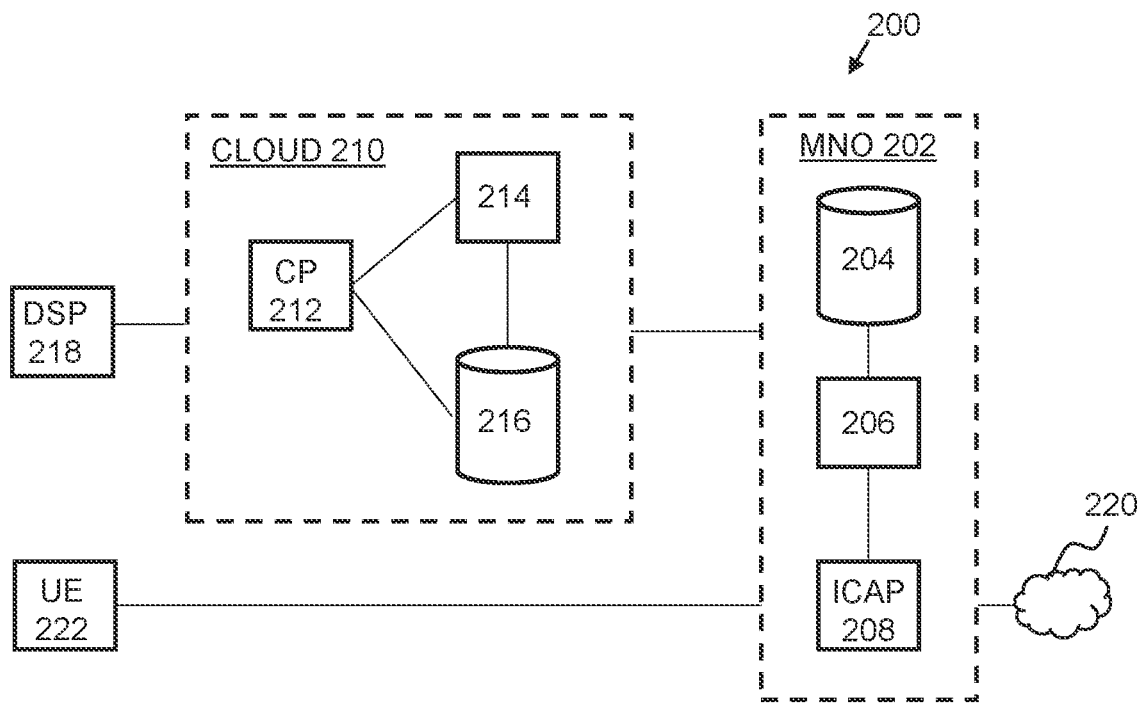
FIG. 2 is a diagram that illustrates schematically a network according to an example.

An example network 200 in which the method of FIG. 1 may be implemented is illustrated in FIG. 2.

Referring to FIG. 2, the network 200 comprises a service provider network 202; a computing cloud 210; a User Equipment (UE) 222; a Demand Side Platform (DSP) 218; and a wider network 220, such as the internet 220.

The UE 222 may be or comprise, for example, a personal computer, a laptop computer, a mobile telephone, a tablet computer, a personal digital assistant or the like. The UE 222 may be configured to communicate voice and or data over the network 200, for example, to request resources and receive responses from the wider network 220.

The service provider network 202 may be arranged to act as a gateway between the UE 222 and the wider network 220. The service provider network 202 may be configured to authenticate UEs 222 of subscribers of the service provider 202. The service provider network 202 may comprise a routing fabric (not shown) for routing traffic between an authenticated subscriber UE 222 and the wider network 220.

The service provider network 202 may be, for example a mobile network operator (MNO) network, or an Internet Service Provider (ISP) network, or the like. In the non-limiting examples described herein, the service provider is an MNO, and the service provider network 202 is an MNO network 202. The MNO network 202 may be arranged to provide telecommunications services to a plurality of subscriber user devices, including the UE 222. For example, the MNO network may comprise a telecommunications network, for example a Global System for Mobile Communications (GSM) network, for example a Universal Mobile Telecommunications System (UMTS) network, e.g. implementing one of the Long-Term Evolution (LTE) standards.

The MNO network 202 comprises a first server 206, a first data store 204, and a third server 208 which is in this example an Internet Content Adaptation Protocol (ICAP) server 208. The MNO network 202 is a private network, for example in the sense that it may not be freely accessed by third parties external to the MNO network 202, for example by means of a firewall or the like.

The first server 206 has access to the first data store 204. In examples described herein, the first data store 204 is a first database 204, although it will be appreciated that this need not necessarily be the case and that in other examples different forms of data storage may be used. The first database 204 stores data in a first predefined format. In this example, the first database 204 stores subscriber data of subscribers to the MNO. For example, the subscriber data may be or comprise Customer Relationship Management (CRM) data for subscribers of the MNO 202. The subscriber data may comprise a first plurality of attributes each associated with first attribute values. For example, the attributes may be "Date of Birth; Car Type" etc. and the associated attribute values may be "Day/Month/Year; Saloon" etc. respectively. The first database 204 stores the subscriber data according to the first predetermined format. For example, the set, syntax, and/or ordering of subscriber attributes and/or attribute values recorded at the first database 204 may be according to the first predetermined format.

The third server 208, which as described above may in some examples be an ICAP server but in other examples may not be an ICAP server, may be configured to modify requests and/or responses, for example HTTP requests or responses, for example originating from or transmitted via the MNO network 202. For example, a browser of the UE 222 may request a web page from the internet 220, for example as a HTTP request. The webpage may be delivered, for example as a HTML document, to the UE 222. The HTML document may contain code which when executed by the browser of the UE 222 causes the UE 222 to request further content. For example, the UE 222 may send a request to or via the ICAP server 208 for content to be used to fill an advertising space of the webpage. In some examples, the ICAP server 208 may modify the advertisement request to indicate that specific content, such as a specified advertising campaign, is to be delivered in response to the request, and send the modified request to an advertisement sever so that the advertisement server may provide the specific content in response. For example, the ICAP server 208 may modify the advertisement request to include an identifier. The modified request, including the identifier, may be forwarded to the advertisement server. The advertisement server may then, on the basis of the identifier included into the request by the ICAP server 208, determine the specific content to provide in response to the request. In some examples, the ICAP server 208 may forward the advertisement request to a specific advertisement server so that content, for example specific content, may be provided by the specific advertisement server in response. In either of these examples, the advertisement server (not shown) may, in response to the request or modified requested received from the ICAP server 208, provide content to the ICAP server 208, and the ICAP server 208 may forward the response to the UE 222.

The first server 206 may be or comprise a Targeted Applications Server (TAS) 206 or TAS platform 206. The first server 206 comprises a data processor (not shown in FIG. 2) configured to process subscriber data from the first database 204 and provide processed data to the ICAP server 208 for its use in modifying requests and/or responses, as described in more detail below. For example, the data processor may be configured to provide a distributed cluster-computing framework. In this sense, it will be appreciated that the first server 206 and/or the data processor thereof may be implemented across multiple computing devices which nonetheless constitute the first server 206 and may provide the functions thereof described herein. The data processor may be configured to execute a data processing job using Spark™, although it will be appreciated that this need not necessarily be the case and that other data processing tools may be used.

The first server 206 is communicatively coupled to the ICAP server 208. In some examples, the first server 206 and the ICAP server 208 may be implemented on separate devices communicatively coupled over the MNO network 202. In other examples, the first server 206 and the ICAP server 208 may be respective functions implemented on a common computing device or a common cluster of computing devices.

The computing cloud 210, hereinafter cloud 210, comprises a second server 212, 214 and a second data store 216. In examples described herein, the second data store 216 is a second database 216, although it will be appreciated that this need not necessarily be the case and that in other examples different forms of data storage may be used. The first server 206 of the MNO network 202 is communicatively coupled to the second server 212, 214 of the cloud 210. For example, the MNO 202 may have a trusted relationship with the operator of the computing cloud 210, but may not, for example, have a trusted relationship with third parties such as the DSP 218. The first server 206 may be installed into the MNO network 202 and configured at least in part by the operator of the cloud 210. Although only one MNO network 202 is shown in FIG. 2 for clarity, it is to be understood that the second server 212, 214 may be communicatively coupled to a plurality of such service provider networks, for example MNO networks (not shown), for example each operated by different service providers, for example by a different mobile network operator.

The second server 212, 214 has access to the second database 216. In this example, the second server 212, 214 implements a front-end 212 and a back-end 214. The front-end 212 of the second server 212, 214 provides a control panel (CP) interface 212. The control panel 212 is arranged to allow third parties, such as the DSP 218, to provide an advertisement campaign (e.g. content to be advertised) as well as to choose and/or specify targeting criteria on the basis of which the campaign is to be targeted (e.g. attributes and attribute values of subscribers to which the campaign is to be delivered). For example, the control panel 212 may present a range of attributes, and associated attribute values, and the DSP 218 may select given attributes and attribute values from the range, on the basis of which it desires a given campaign to be targeted.

The DSP 218 is a platform that provides requests to the cloud 210 to implement advertising campaigns. Specifically, the DSP 218 has access to the control panel 212 of the second server 212, 214. As mentioned, the DSP 218 may specify, via the control panel 212, an advertising campaign and targeting criteria for the campaign. For example, the campaign may specify the content that is to be delivered to targeted subscribers, and the targeting criteria may comprise desired attributes and attribute values of subscribers to which the campaign is to be targeted.

The targeting criteria may be in a second predefined format, different to the first predefined format according to which data is stored at the first database 204 of the MNO 202. For example, the set, syntax and/or ordering of subscriber attributes and/or attribute values selectable at the control panel 212 of the cloud 210 and/or specified by the DSP 218 from the selectable range, may be different to the set, syntax and/or ordering of subscriber attributes and/or attribute values as stored at the first database 204 of the MNO 202. As mentioned above, there may be multiple MNOs (not shown in FIG. 2) communicatively coupled to the second server 212, 214, each of which may store subscriber data (e.g. subscriber attributes and attribute values) in a predefined format different to the second predefined format (and different to that at each other of the MNOs).

In an illustrative, comparative, example (not shown), the targeting of content to specific subscribers could be implemented by the MNO 202 based on subscriber data at the MNO 202 and on targeting criteria hard-coded (e.g. by hand) at the MNO 202, for example hard-coded at the first server (e.g. TAS) 206 of the MNO 202. For example, the MNO 202 may be hard-coded with targeting criteria for use with the first predefined format according to which the subscriber data at the MNO 202 is stored, based on targeting criteria selected at the cloud 210. The MNO 202 may then identify advertisement requests from UE's 222 that have subscriber data that meets given hard-coded targeting criteria associated with a given campaign, and accordingly include an identifier into that request to cause an advertisement server to deliver content associated with the given campaign into a response to that advertisement request. However, hard-coding the targeting criteria may present flexibility, responsiveness, and efficiency problems. For example, each time targeting criteria at the cloud 210 is modified, for example each time a new attribute on the basis of which a subscriber can be targeted is added, the codebase at the MNO 202 would need to be correspondingly modified (e.g. by hand) to account for the new attribute and how it relates to the subscriber data stored at the MNO 202. This may be relatively slow and inefficient, which inefficiency may be compounded by different MNOs 202 each storing their respective subscriber data in different formats. These problems may be addressed by the present invention, as described in more detail below.

Returning to FIG. 1, as mentioned, there is illustrated schematically a method of processing data in a network according to an example of the present invention. In broad overview, the method comprises, in step 102, transmitting, from the first server 206 to the second server 212, 214, first information characterising the first predefined format according to which the first data is stored at the first database 204. The method comprises, in step 104, obtaining, at the second server 212, 214, mapping information characterising a mapping of the first predefined format onto the second predefined format. The method comprises, in step 106, generating, at the second server 212, 214, based on the first information and the mapping information, second information for converting data in the first predefined format into data in the second predefined format. The method comprises, in step 108, transmitting, from the second server 212, 214 to the first server 206, the second information. The method comprises, at step 110, parsing, at the first server 206, using the second information, the first data stored at the first database 204, to generate data in the second predefined format.

According to this method, the first data may be parsed to generate data in the second predefined format at the first server 206 using the second information provided by the second server 212, 214. This may allow targeting based on subscriber data stored at and private to the MNO 202, but according to targeting criteria as specified at the second server 212, 214. This methodology may be applied centrally at the second server 212, 214 amongst a plurality of such MNOs 202. Moreover, such targeting may be provided for without having to modify (e.g. by hand), the codebase at the first server 206 itself. Therefore, for example, if the second predefined format is changed (e.g. if a new attribute is to be added to the targeting criteria), this may be implemented at the first server 206 of the MNO 202 using updated second information transmitted from the second server 212, 214. This may be performed more flexibly, responsively, and efficiently for example as compared to modifying (by hand) the hard-coded codebase at the first MNO 202 (or indeed at each of a plurality of such MNOs 202) each time such a change is to be implemented.

Returning to the method of FIG. 1 in more detail, the method is carried out in a network. In the examples described herein, the network is the network 200 described with reference to FIG. 2, although it will be appreciated that in other examples other networks may be used. The network 200 comprises a first server 206 and a second server 212, 214. In this example, the first server is the first server 206 of the MNO 202, and the second server is the second server 212, 214 of the cloud 210, described with reference to FIG. 2. The first server 206 has access to a first database 204 that stores first data according to a first predefined format. In this example, the first database 204 is the first database 204 of the MNO 202 and the first data is subscriber data that is stored according to the first predefined format described with reference to FIG. 2.

As mentioned, the method comprises, in step 102, transmitting, from the first server 206 to the second server 212, 214, first information characterising the first predefined format according to which the first data is stored at the first database 204.

In examples described herein, the first information is referred to as a Writer Schema. The Writer Schema may be a file describing the first predefined format. For example, the Writer Schema may be a file describing the way in which the subscriber data is stored at the first database 204. For example, the Writer Schema may specify in what format the subscriber data will be provided to the first server 206, for example the metadata information necessary for the first server 206 to understand the subscriber data, when the first server 206 retrieves the subscriber data from the first database 204. For example, the Writer Schema may include information on the datatypes, expected attribute and attribute value formats, and/or expected attribute position within subscriber data stored at the first database 204. In some examples, the Writer Schema may be a JavaScript Object Notation (JSON) file.

In some examples, the Writer Schema may characterise a first plurality of attributes that the MNO 202 stores on subscribers, and/or the format or categories according to which an associated plurality of attribute values may be specified.

In some examples, the Writer Schema may further characterise a selected range of the first plurality of attributes. For example, the Writer Schema may indicate the range of attributes (e.g. a subset of the full range of attributes of subscribers stored at the first database 204) on the basis of which the MNO 202 is prepared to allow targeting.

In some examples, transmitting the first information (i.e. Writer Schema) to the second server 212, 214 may comprise the first server 206 pushing the first information to the second server 212, 214, for example whenever an update to the first information is made by the MNO 202. In some examples, the Writer Schema, for example the Writer Schema JSON file, may be stored at the second server 212, 214, for example the control panel 212 of the second server 212, 214, and/or at the second database 216. In some examples, the Writer Schema may be versioned, i.e. comprise or be otherwise associated with a version number. For example, in examples where the first server 206 generates the Writer Schema, the first server 206 may include into the Writer Schema a version number. When the second server 212, 214 receives Writer Schema, it may compare the version number of the received Writer Schema with the version number of a Writer Schema it has already stored, and if the version number of the received Writer Schema is higher than the version number of the already stored Writer Schema, then the second server 212, 214 may overwrite the stored version with the newer version of the Writer Schema. For example, the first server 206 of the MNO 202 may update the Writer Schema in cases where the MNO 202 would like to change the range of subscriber data on the basis of which content is to be targeted.

In some examples, the Writer Schema may be defined by the MNO 202. In some examples, the Writer Schema may be defined by the MNO 202 with support from the operators of the cloud 210. In some examples, there may be a plurality of MNOs 202 associated with the cloud 210, and each MNO 202 may provide a different Writer Schema to the second server 212, 214.

As mentioned, the method comprises, in step 104, obtaining, at the second server 212, 214, mapping information characterising a mapping of the first predefined format onto the second predefined format different to the first predefined format. For example, the mapping information may be stored in a memory of the second server 212, 214, and/or the mapping information may be stored in the second database 216 and the second server 212, 214 may retrieve the mapping information from the second database 216. The second predefined format may be the format of attributes and associated attribute values selectable as targeting criteria through the control panel 212 of the second server 212, 214. The second predefined format may be the format of an internal repository for subscriber data of the first server 206.

In some examples, the first predefined format comprises a first plurality of attributes each associated with first attribute values, and the second predefined format comprises a second plurality of attributes each associated with second attribute values. In these examples, the mapping information may comprise information characterising a mapping of the first plurality of attributes onto the second plurality of attributes and/or a mapping of the first attribute values onto the second attribute values.

In some examples, the mapping information may comprise a set of attribute mappings for allowing the first server 206 to understand how the attributes of the subscriber data at the first database 204—and as described by the Writer Schema—map onto the attributes exposed through the control panel of the second server 212, 214 as targeting criteria. In some examples, the attribute mappings may specify attribute transformations for transforming an attribute of the first predefined format onto an attribute of the second predefined format, that is as per the attribute representation used at the control panel 212 of the second server 212, 214. In some examples, the mapping information, for example the attribute mappings, may be defined through the control panel 212 and based on the Writer Schema provided.

In some examples, the mapping information may map a location of a first attribute and associated attribute value in the first predefined format to a location of that same or similar attribute and attribute value in the second predefined format. For example, within a given subscriber record, the attribute "Date of Birth" may be in a first row or column in the first predefined format, but in a fourth row or column in the second predefined format.

As mentioned, in some examples, the mapping information may include attribute transformations. For example, an example first attribute may be "Date of Birth:", and the associated attribute value format may be "[Day/Month/Year]". The second attribute may be "Age:" and the associated attribute value format may be "[Age in Years]". In this example, the mapping information may map both the first attribute and first attribute value format onto the second attribute and associated attribute value format. For example, the mapping information may comprise a function that transforms the attribute "Date of Birth:" into the attribute "Age:", and the attribute value format "[Day/Month/Year]" into "[Age in Years]", for example by including a transformation function that subtracts the value extracted from the value format "[Day/Month/Year]" from a current date takes as the "[Age in Years]" value the number of years resulting from the subtraction.

In some examples, the mapping information may map a first attribute onto a second attribute but not necessarily change the associated attribute value format. For example, a first attribute may be "Post Code", and the second attribute may be "Zip Code", and the second attribute value and its format may be unchanged from the first attribute value.

In some examples, the mapping information may map a first attribute value onto a second attribute value but not necessarily change the attribute. For example, the first attribute may be "Purchasing Power" and the first attribute value may be "[number out of 10]" and the second attribute may be "Purchasing power" and the second attribute value may be "[number out of 100=number out of 10 multiplied by 10]".

In some examples, the mapping information may be a many-to-few mapping, for example, wherein a plurality of first attributes and/or associated attribute values are mapped to a single second attribute and/or attribute value. For example, two first attribute and attribute values may be "Purchasing Power: [$1^{st}$ Number out of 10]" and "Credit Score: [$2^{nd}$ Number out of 10]", and the mapping information may map these onto a single second attribute and attribute value, e.g. "Purchase factor: [number out of 100=$1^{st}$ Number out of 10 multiplied by $2^{nd}$ number out of 10]". In some examples, the mapping information may be a few-to-many mapping, for example, wherein one or more first attributes and/or associated attribute values are mapped to a higher number of second attributes and/or attribute values.

In some examples, a plurality of first attributes and/or associated attribute values as stored in the first database 204 may be used to create a new or different second attribute and/or attribute values that are selectable at the control panel 212 of the second server. For example, two (or three or four . . . or n) first attributes and/or associated attribute values may be combined to produce one (or two or three . . . or n−1) second attribute and/or associated attribute value. For example, two first attribute and attribute values may be "Purchasing Power: [$1^{st}$ Number out of 10]" and "Credit Score: [$2^{nd}$ Number out of 10]", and these may be used to create a new, single second attribute and attribute value, e.g. "Purchase factor: [number out of 100=$1^{st}$ Number out of 10 multiplied by $2^{nd}$ number out of 10]" that is selectable at the control panel 212 of the second server. In this case, the mapping information may map the two or more first attributes and associated attribute values onto the one second attribute and associated attribute value.

The mapping information may be determined using known rules or, for example, by user input for example at the control panel 212, and stored in the second database 216 and/or in a memory of the second server 212, 214.

As mentioned, the method comprises, in step 106, generating, at the second server 212, 214, based on the first information and the mapping information, second information for converting data in the first predefined format into data in the second predefined format. For example, the format mapping as specified in the mapping information may be applied to the Writer Schema file provided by the first server 206 to produce the second information. The second information is also referred to herein as a Reader Schema. The Reader Schema may be a JSON file. The Reader Schema may indicate information for enabling data stored in the first predefined format to be parsed and converted into data in the second predefined format. For example, the Reader Schema may specify, for a given desired second attribute, the location and formatting of the corresponding first attribute and attribute value in a given subscriber record, and the mapping that is to be applied to the attribute or attribute value in order to covert the data to the second predefined format. In some examples, the second predefined format may be the format maintained in the internal repository of the first server 206, and the Reader Schema may contain all the information necessary for data stored in the first predefined format in the first database 204 to be stored in the internal repository (not shown) of the first server 206. In other words, in some examples, the Reader Schema comprises information necessary for the first server 206 to understand how subscriber data in the first predefined format obtained from the first database 204 is structured, and how it is to be processed in order to be stored in an internal repository of the first server 206, which may be structured according to the second predefined format.

In some examples, the generated Reader Schema comprises such conversion instructions corresponding to, for example corresponding only to, the selected range of the first plurality of attributes as provided in the Writer Schema. For example, this may allow that processing to produce the Reader Schema is only carried out for those attributes on the basis of which targeting is deemed allowable by the MNO 202, which may improve efficiency and reduce time and resources needed to generate the Reader Schema.

In some examples, the Reader Schema may be generated by the control panel 212 of the second server 212, 214, and stored in a repository local to the second server 212, 214, for example an internal memory of the second server 212, 214 and/or the second database 216.

As mentioned, the method comprises, in step 108 transmitting, from the second server 212, 214 to the first server 206, the second information (i.e. the Reader Schema). In some examples the transmitting of the Reader Schema from the second server 212, 214 to the first server 206 may comprise the first server 206 fetching the Reader Schema from the second server 212, 214. For example, the first server 206 may fetch the Reader Schema from the second server 212, 214 periodically. This may help ensure that the Reader Schema at the MNO 202 is up to date. In some examples, the Reader Schema may be versioned. When a Reader Schema is generated, a version number may be associated with it included in the Reader Schema. When the first server 206 fetches a Reader Schema, the first server 206 may compare the version number of the fetched Reader Schema with and Reader Schema already stored, and if the version number of the fetched Reader Schema is higher than that of the one stored, then the first server 206 may overwrite the already stored Reader Schema with fetched Reader Schema.

In some examples, there may be one Reader Schema generated per MNO 202 associated with the cloud 210, and fetching the Reader Schema may comprise the first server 206 fetching the Reader Schema associated with its MNO 202 from among a plurality of Reader Schemas each associated with a different MNO 202.

As mentioned, the method comprises, in step 110, parsing, at the first server 206, using the second information (i.e. Reader Schema), the first data stored at the first database 204, to generate data in the second predefined format. For example, the first server 206 may use the Reader Schema to determine, for a given second attribute of the second predefined format, the location and formatting of the corresponding first attribute and attribute value in a given subscriber record of the first data in the first database 204. Once the attribute and/or attribute value is located, the first server 206 may then use the Reader Schema to determine for this first attribute and attribute value, the mapping that is to be applied in order to covert the data to the second predefined format. The first server 206 may then apply the determined mapping to the first attribute and/or attribute thereby to generate the data in the second predefined format. The data, being in the second predefined format, may then be stored, for example, in an internal repository (not shown) of the first server 206, for example for further use (as described in more detail below).

In some examples, the parsing may comprise parsing the first data corresponding to, for example, corresponding only to, the selected range of first attributes, to generate the subscriber data in the second predefined format. This may be implemented by the first server 206 for example in cases where the Reader Schema includes conversion information corresponding to, for example corresponding only to, the selected range of first attributes. For example, the Reader Schema may not include location information for attributes that are not in the selected range of attributes. Accordingly, in some examples, the generated subscriber data in the second predefined format comprises subscriber data corresponding to, for example corresponding only to, the selected range of first attributes, i.e. data for only those attributes considered allowable for targeting by the MNO 202. This may allow that processing to produce the subscriber data in the second predefined format is only carried out for those attributes on the basis of which targeting is deemed allowable by the MNO 202, which may improve efficiency and reduce time and resources needed to generate the subscriber data in the second predefined format.

In any case, the generated subscriber data, being in the second predefined format, may be used by the first server 206 in segmenting subscribers according to targeting criteria as specified at the control panel 212 of the second server 212, 214 (as described in more detail below). This is achieved without the second server 212, 214 or the DSP 218 having had access to the actual attribute values of the subscriber data as stored at the first database 204, which data is private to the MNO 202. Hence data privacy and protection of that subscriber data is provided for.

In some examples, the method may comprise substantially repeating steps 106 to 110 whenever the Writer Schema or mapping information is updated. For example, the method may comprise, when the Writer Schema is updated at the first server 206 and/or the mapping information is updated at the second server 212, 214: transmitting, from the first server 206 to the second server 212, 214, the updated information and/or obtaining the updated mapping information; generating an updated Reader Schema based on the updated Writer Schema and/or the updated mapping information; transmitting, from the second server 212, 214 to the first server 206, the updated second information; and parsing, at the first server 206, using the updated second information, the first data stored at the first database 204, to generate data in an updated second predefined format. These steps may be carried out in the same way as described above for steps 102 and/or 204, 106, 108, and 110 respectively.

For example, the MNO 202 may update the Writer Schema when the MNO 202 changes, for example adds attributes or attribute values to the subscriber data. As another example, the MNO 202 may update the Writer Schema when the range of attributes on the basis of which targeting is deemed allowable by the MNO 202 changes. The updated Writer Schema is transmitted to the second server 212, 214. For example, the Writer Schema may be versioned, as described above. Receipt of the updated Writer Schema (e.g. receipt of a Writer Shema from the MNO 202 that has a version number higher than a stored Writer Schema for the MNO 202) by the second server 212, 214 may cause the second server 212, 214 to generate an updated Reader Schema on the basis of the updated Writer Schema and store the updated Reader Schema. The first server 206 may fetch the updated Reader Schema, and receipt of same at the first server 206 may cause the first server 206 to parse again the subscriber data 204, this time according to the updated Reader Schema, to generate and store subscriber data in the second predefined format.

As another example, the cloud 210 may update the targeting criteria that it offers through the control panel 212. For example, the DSP 218 (or the MNO 202 or another MNO or another entity) may request that a new targeting criterion be added. Accordingly, the mapping information may be updated to account for this new targeting criterion. Updating of the mapping information may cause the second server 212, 216 to generate an updated Reader Schema on the basis of the updated mapping information and store the updated Reader Schema in the local database 216. The first server 206 may fetch the updated Reader Schema, and receipt of same at the first server 206 may cause the first server 206 to parse again the subscriber data 204, according to the updated Reader Schema, to generate and store subscriber information in the second predefined format, for example for use by the first server 206 in segmenting subscribers according to targeting criteria as specified at the control panel 212 of the second server 212, 214 (as described in more detail below).

Accordingly, if the Writer Schema or the mapping information is changed (e.g. if a new attribute is to be added to the targeting criteria), the effects of this change may be implemented at the first server 206 of the MNO 202 using updated second information transmitted from the second server 212, 214, which may be performed more efficiently and rapidly for example as compared to modifying (by hand) the codebase at the first server 206 (or indeed at each of a plurality of such MNOs 202 with which the cloud 210 is configured to operate).

As mentioned, the generated subscriber data (updated or otherwise), being in the second predefined format, may be used by the first server 206 in segmenting subscribers according to targeting criteria as specified at the control panel 212 of the second server 212, 214.

Specifically, in some examples, the method may further comprise: obtaining, at the second server 212, 214, segmentation information characterising one or more second attribute values on the basis of which the data in the second predefined format is to be segmented. For example, the DSP 218 may specify at the control panel 212 of the cloud 210 a campaign, for example content desired to be advertised to subscribers, and the targeting criteria characterising the attribute values of the segment of the subscriber population to which the content is desired to be advertised. For example, the DSP 218 may wish for the content to be targeted at subscribers having a saloon car. The DSP 218 may therefore select the second attribute "Car type" and the associated second attribute value "saloon" from the available targeting criteria at the control panel 212. The second server 212, 214 may process the selected targeting criteria into segmentation information. In examples described herein, the segmentation information may be provided as a Data Update Package (DUP). The DUP may take the form of a JSON file. The second server 212, 214 may store the DUP in the second database 216. The DUP may be versioned, similarly to as described above.

The method may then comprise transmitting, from the second server 212, 214 to the first server 206, the segmentation information. For example, the segmentation information may be transmitted in the form of the DUP. For example, the first server 206 may fetch the DUP from the second server 212, 214. For example, the DUP may be stored in a local repository of the second server 212, 214, for example in the second database 216, and the first server 206, for example the data processor of the first server 206, may fetch the latest DUP.

In some examples, there may be one DUP generated per MNO 202 associated with the cloud 210 and fetching the DUP may comprise the first server 206 fetching the DUP associated with its MNO 202 from among a plurality of such DUPs.

The method may then comprise, at the first server 206, segmenting the data in the second predefined format based on the segmentation information, thereby to produce a segmentation output (described in more detail below with reference to FIG. 4). For example, the first server 206 may take the subscriber data in the second predefined format (generated by parsing the subscriber data stored in the first predefined format at the first database 204, using the Reader Schema), and apply the DUP to the subscriber data to segment subscribers that have attribute values corresponding to those specified in the segmentation information of the DUP. This may produce a segmentation output, which may be, for example, a list of subscribers (or subscriber identifiers for subscribers) to which the content specified in the DUP is to be targeted. The segmentation output may be a file. The segmentation output may be stored, for example, in a repository of the second server 206. This segmentation output may be used by, for example, the third (e.g. ICAP) server 208, for the third server 208 to determine into which requests content identifiers are to be added, so that responses to those requests include the specified content.

The steps of obtaining and transmitting the DUP to the first server 206, and the first server 206 producing the segmentation output, may be repeated, for example each time the targeting criteria for a campaign is changed. For example, a Data Update Package may be generated by the control panel 212 of the second server 212, 214 whenever there are changes in the active campaigns or targeting criteria or desired segments.

For example, the segmentation information may be updated at the second server 212, 214. This may be as a result of the targeting criteria changing, or for example as a result of the content of the associated campaign changing. In any case, the method may comprise, when the segmentation information is updated at the second server 212, 214: obtaining, at the second server 212, 214, the updated segmentation information; transmitting, from the second server 212, 214 to the first server 206, the updated segmentation information (i.e. updated DUP); and at the first server 206, segmenting the data in the second predefined format based on the updated segmentation information (i.e. updated DUP), thereby to produce an updated segmentation output. As mentioned, the DUP may be versioned. When the first server 206 receives, for example fetches, an updated DUP that has a version number higher than a DUP already stored locally, the first server 206 may replace or overwrite the existing DUP with the updated DUP. Receipt of the updated DUP may cause the first server 206 to re-segment the generated subscriber data in the second predefined format, thereby to produce updated segmentation output. Receipt of the updated DUP may, in some examples, also cause the first server 206 to parse again the subscriber in the first predefined format to generate the data in the subscriber data in the second predefined format. This may allow that an updated DUP may be applied in addition to any new subscribers that have been added since the previous parsing.

In some examples, the DUP and the Reader schema may both be stored in the same repository local to the second server 212, 214 of the cloud 210, such as the second database 216. In some examples, the DUP and the Reader schema may be stored in separate repositories local to the second server 212, 214 of the cloud 210.

In some examples, the method may comprise transmitting, from the first server 206, the segmentation output to a third server for the third server to use in modifying one or more messages received at the third server (described in more detail below with reference to FIG. 5). For example, the third server may be the ICAP server 208. The transmitting of the segmentation output may comprise the third server 208 fetching the segmentation output from the first server 206, for example periodically. The segmentation output may be versioned so that the ICAP server 208 may use only the most recent version of the segmentation output fetched from the first server 206.

In some examples, the method may comprise, at the third server 208, modifying a message based on the segmentation output. For example, the third server 208, for example the ICAP server 208, may receive a message from the UE 222, for example a HTTP message, including a request for an advertisement. The message may include information, for example header information, for example a UE identifier, that identifies the source of the message as the UE 222. The ICAP server 208 may determine from the message the subscriber with which the UE 222 is associated. The ICAP server 208 may then read the segmentation output (i.e. the most recent version of the segmentation output) to determine whether the identified subscriber is a subscriber present in the segmentation output. If the identified subscriber is present in the segmentation output, the ICAP server 208 may then modify the advertisement request to indicate that content as specified in the DUP is to be delivered in response to the request, and send the modified request to an advertisement sever so that the advertisement server may provide the specific content in response. The ICAP server 208 may then forward the response to the UE 222. The UE may then read the response and render the content in a browser of the UE 222. For example, if the identified subscriber is present in the segmentation output, the ICAP server 208 may add an identifier of the content specified in the DUP to the ad request. The ICAP server 208 may then transmit the modified request to the advertisement server. The advertisement server may then determine, based on the identifier included in the modified request, the content to be delivered in response to the request. The advertisement server may then include the determined content (or a link to the determined content, or the like) into a response to the ad request. The advertisement server may then send the response (e.g. via the ICAP server 208) to the UE 222, which may then render the content accordingly. In some examples, if the identified subscriber is present in the segmentation output, the ICAP server 108 may forward the advertisement request to a specific advertisement as specified in the DUP so that specified content may be provided by the advertisement server in response.

Accordingly, content may be targeted to subscribers based on subscriber data stored at and private to the MNO 202, but according to targeting criteria as specified at the second server 212, 214 external to the MNO network 202, and moreover in a way that responds rapidly and efficiently to any dynamic changes in targeting criteria or the subscriber data, i.e. without having to modify (e.g. by hand), the codebase at the first server 106. Moreover, this method may be applied in a scalable manner to a plurality of MNOs 202, for example each providing their respective Writer Schemas to the second server 212, 214, and each receiving from the second server 212, 214 respective Reader Schemas and DUPs on the basis of which content may be targeted to respective subscribers. An efficient and scalable method is therefore provided.

Figure 3:
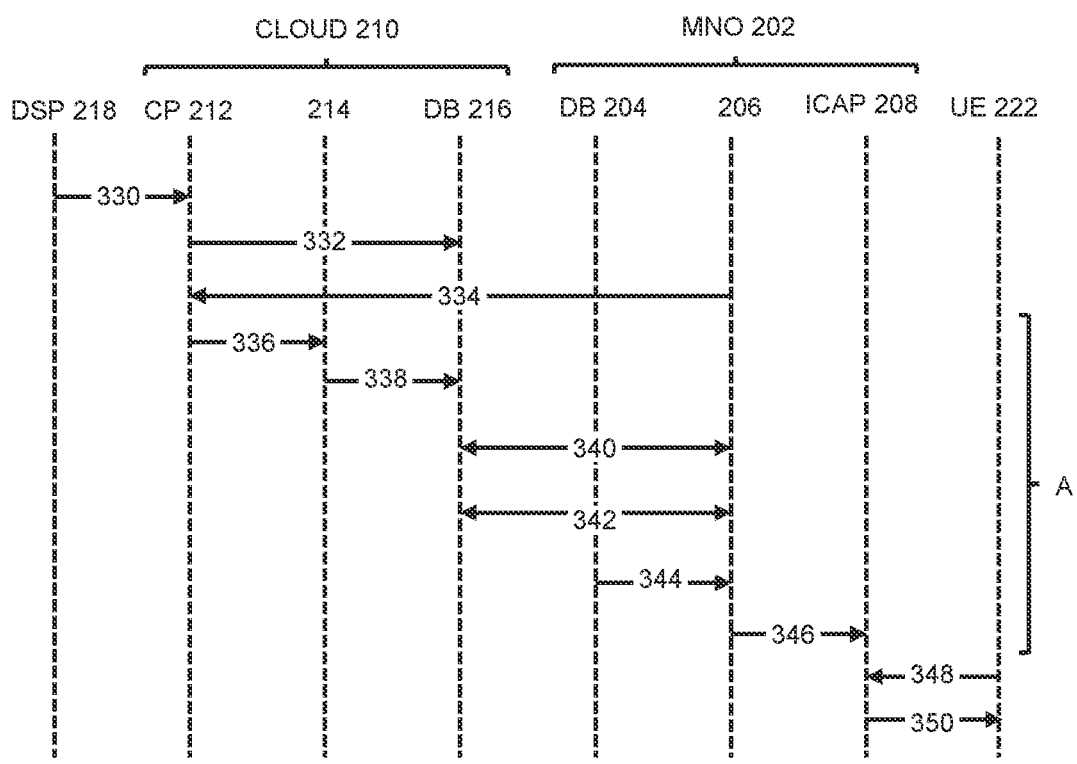
FIG. 3 is a signalling diagram that illustrates schematically signalling in the network of FIG. 2, according to an example.

Referring to FIG. 3, there is illustrated a signalling diagram showing signalling between the various entities of FIG. 2, according to an example.

The DSP 218 provides 330 targeting criteria and content to be advertised (and/or an identifier of the content to be advertised) to the control panel 212 of the cloud 210. The control panel 212 stores 332 the targeting criteria as segmentation information, and the content (and/or the identifier of the content to be advertised), in a Data Update Package (DUP) in the second database 216. The first server 206 of the MNO 202 sends 334 a Writer Schema to the control panel 212. The control panel 212 sends 214 the Writer Schema to the second server back-end 214, which uses the Writer Schema in combination with mapping information to generate a Reader Schema. The back-end 214 stores 338 the Reader Schema in the second database 216. The first server 206 fetches 340 the Reader Schema and fetches 342 the DUP from the second database 216. On determining that the Reader Schema and/or the DUP is a newer version than currently held at the MNO 202, the second server 206 obtains 334 the subscriber data in the first predefined format from the first database 204. The second server 206 parses the obtained subscriber data using the Reader Schema to generate subscriber data in the second predefined format. The second server 206 applies the segmentation information from the DUP to the subscriber data in the second predefined format to generate the segmentation output. The second server 206 sends 326 the segmentation output to the ICAP server 208. The ICAP server 208, at some later stage, receives 348 a message including an advertisement request, from a UE 222 of a subscriber. The ICAP server 208 analyses the message to determine whether the subscriber is a subscriber specified in the segmentation output, and if so then adds an identifier of the content to the request before sending to an advertisement server (not shown). The advertisement server (not shown) determined from the identifier the content to include in response to the request, and sends a response including the determined content to the ICAP server 208 (not shown). The ICAP server then forwards 350 the response to the UE 222. The steps 336 to 346 (labelled A in FIG. 3) may be repeated when a new Writer Schema is received from the MNO 202 and/or when a change to the mapping information is made and/or when a new DUP is generated.

Figure 4:
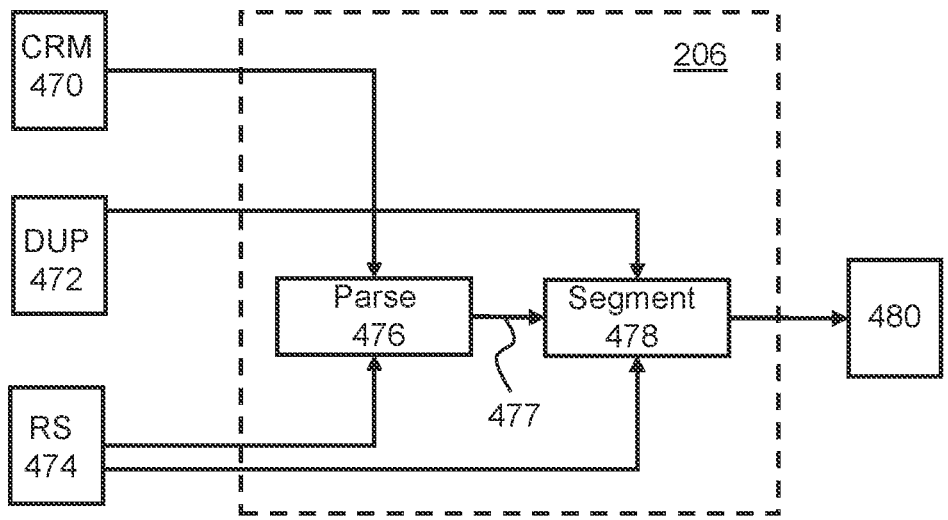
FIG. 4 is a flow diagram that illustrates schematically processing of data according to an example.

Referring to FIG. 4, there is illustrated a flow diagram showing in more detail generation of the segmentation output 480 at the first server 206, according to an example.

The first server 206 may be configured to execute the following tasks in the following order. For example, the tasks may be executed by the data processor of the first server 206. In some examples, the tasks may be executed using a time-based job scheduler, for example by using a Cron job. First, the first server 206 may retrieve from the second server 212, 214 the latest version of the Reader Schema (RS 474) associated with the MNO 202. Then, the first server 206 may retrieve from the second server 212, 214, the latest version of the Data Update Package (DUP 472) associated with the MNO 202. Then, the first server 206 may check if there is new subscriber data (CRM 470) available to be processed. Then, the first server 206 may compare the DUP 472 and Reader Schema 474 versions against versions stored locally at the first server 206. Then the first server 206 may determine if it is necessary to trigger the parsing and segmentation processes based on the DUP 472 and Reader Schema 474 versions and the availability of new subscriber data CRM 470. If any one of the DUP 472, Reader Schema 474, and CRM 470 data has changed, a parse unit 476 of the first server 206 may use the Reader Schema 474 to parse the subscriber data in the first predefined format 470, thereby to produce a parsing output 477. A segment unit 478 of the first server 206 may then use the Reader Schema 474 and the DUP 472 to generate subscriber data in the second predefined format, and to segment the subscriber data in the second predefined format to produce the segmentation output 480. The first server 206 may then write the segmentation output to a set of files 480 to be uploaded to the ICAP server 208, for example a cache of the ICAP server 208. In other examples, the segmentation output may be stored at the first server 206. For example, the segmentation output may be held at the first server 206 in the form of a flag against each subscriber that is included in the segmentation output. The ICAP server 208 may then query the segmentation output held at the first server, for example when a request from the UE is received at the ICAP server 208, to determine whether or not the request is from or relates to a subscriber for which there is a segmentation output flag. If the request is from or relates to a subscriber for which there is a segmentation output flag at the first server 206, the ICAP server 208 may then include an appropriate content identifier into the message (for example as described above), or otherwise modify the request so that the appropriate content is delivered to or accessed by the UE 222.

Figure 5:
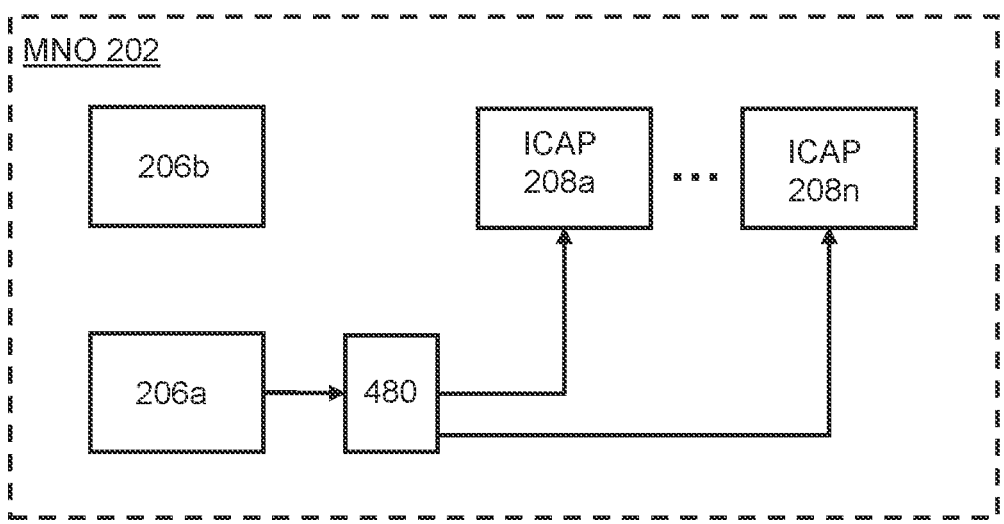
FIG. 5 is a diagram that illustrates schematically components of a service provider network, according to an example.

Referring to FIG. 5, there is illustrated a flow diagram showing in more detail transmitting of the segmentation output 480 to ICAP servers 208 according to an example.

In this example, the MNO network 202 comprises a plurality, in this example two, instances 206a, 206b of the first server. For example, the MNO network may comprise two instances of the data processor 206a, 206b, each associated with a respective instance of the first server 206a, 206b. One of the instances 206a may be operational while a second of the instances 206 is in Standby in case of a failure of the other instance 206a. There may be a switch mechanism (not shown) between the two instances, for example configured to allow manual switching between the two instances in case of failure of one of the instances 206a, 206b.

In this example, the MNO network 202 comprises a plurality of ICAP servers 208a, ..., 208n. As mentioned, the segmentation output of the first server 206a is written to a set of segmentation output files 480. The segmentation output files 480 may be stored locally to the first server 206a. The segmentation output files 480 may be stored as a Network File System (NFS) mount, with each of the ICAP servers 208a, ..., 208n having a link to the NFS mount. This may allow that as soon as a segmentation process is finished, i.e. as soon as new segmentation output files 480 are generated, the segmentation output files 480 will be available on each of the plurality of ICAP servers 208a, . . . , 208n.

Each of the ICAP servers 208a, . . . 208n may check periodically for new segmentation output files 480 present in the NFS mount at the respective ICAP server 208a, . . . 208n. For example, this may be achieved by running a suitable Cron job at each of the ICAP servers 208, . . . , 208n. In some examples, if new segmentation output files 480 are found by a given ICAP server 208a, . . . 208n, the ICAP server 208 . . . 208n may shut itself down, or shut down the router associated with the ICAP server 208a, . . . , 208n, in order to prevent ICAP server 208a, . . . , 208n from modifying messages while the local cache is being updated. While the given ICAP server 208a, . . . 208n (or associated router) is down, the ICAP server 208a, . . . 208n may load the new segmentation output files 480. For example, the ICAP server 208a, . . . 208n, may bulk load the new segmentation output files 480 into a REDIS (i.e. an in-memory data structure store for cache applications) of the ICAP server 208a, . . . 208n. Once this has completed, the ICAP server 208a, . . . 208n may start itself again, or start the router associated therewith, again. The shut-down, load, and restart, may be implemented by the Cron job, for example. This may provide that each ICAP server 208a, . . . 208n need only depend on its local cache, rather than for example needing to refer back to a repository at the first server 206, in order to modify messages, which may be efficient.

In some examples, in order to prevent all of the ICAP servers 208a, . . . 208n shutting down at once, the ICAP servers 208a, . . . 208n may be configured to shut down in a coordinated fashion, for example one at a time. For example, each ICAP server 208a, . . . 208n, for example the Cron job running at each ICAP server 208a, . . . 208n, may be configured such that, if there are N ICAP servers 208s, . . . 208n, then at any point in time there are at least N−1 ICAP servers 208a, . . . 208n operational. This may provide for the benefits of the ICAP servers 208a, . . . 208n needing only to refer to their cache when modifying responses, whilst ensuring that a maximum of the ICAP servers 208a, . . . 208n remain operational during update.

Figure 6:
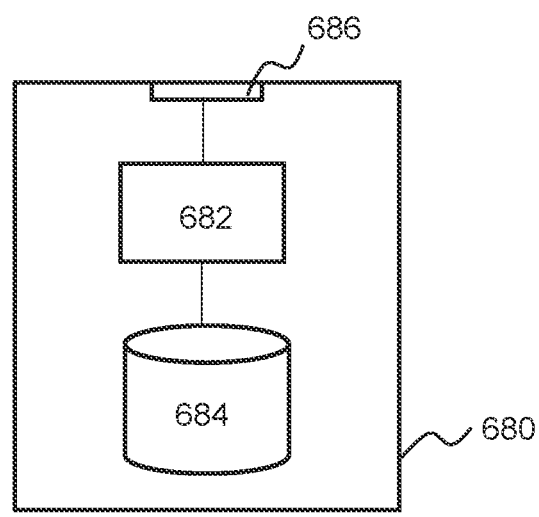
FIG. 6 is a diagram that illustrates schematically an apparatus according to an example.

Referring to FIG. 6, there is illustrated an apparatus 680 according to an example. The apparatus 680 comprises a processor 682, a memory 684, and an input/output port 686. The memory 684 may store instructions which when executed by the processor 682 causes the apparatus 680 to perform methods. The input/output port 686 may allow the apparatus 680 to send and receive signals, for example data, to other entities in a network, for example network 200.

For example, the first server 206 described above may be or comprise an apparatus such as the apparatus 680, which may be arranged to perform the functions of the first server 206 according to any of the examples described above. For example, the memory 684 may store instructions which when executed by the processor 682 causes the apparatus 680 to perform the functions of the first server 206 described above with reference to FIGS. 1 to 5.

For example, the apparatus 680 may have access to the first database 204 and be arranged to perform a method of processing data in a network, the method comprising, at the apparatus: transmitting, to the second server 212, 214, first information characterising the first predefined format according to which the first data is stored at the first database 204; receiving, from the second server 212, 214, second information for converting data in the first predefined format into data in a second predefined format different to the first predefined format, the second information having been generated at the second server 212, 214 based on the first information transmitted to the second server 212, 214 and mapping information characterising a mapping of the first predefined format onto the second predefined format; and parsing, using the second information, the first data stored at the first database, to generate data in the second predefined format.

In some examples, the first database 204 may be provided by the memory 684 of the apparatus 680 or may be provided by a separate database.

As another example, the second server 212, 214 described above may be or comprise an apparatus such as the apparatus 680, which may be arranged to perform the functions of the second server 212, 214 according to any of the examples described above. For example, the memory 684 may store instructions which when executed by the processor 682 causes the apparatus 680 to perform the functions of the second server 212, 214 described above with reference to FIGS. 1 to 5.

For example, the apparatus 680 may be arranged to perform a method of processing data in a network, the method comprising, at the apparatus: receiving, from the first server 206, first information characterising the first predefined format according to which the first data is stored at the first database; obtaining mapping information characterising a mapping of the first predefined format onto a second predefined format different to the first predefined format; generating, based on the first information and the mapping information, second information for converting data in the first predefined format into data in the second predefined format; and transmitting, to the first server 206, the second information for the first server 206 to use to parse the first data stored at the first database 204 to generate data in the second predefined format.

In some examples, the second database 216 may be provided by the memory 684 of the apparatus 680 or may be provided by a separate database. In some examples, the functions of the third server 208, for example the ICAP server 208, described above may be implemented on an apparatus such as the apparatus 680. In some examples, a single apparatus 680 may be arranged to provide the functions of both the first server 206 and the ICAP sever 208 described above.

In any of the examples described herein, the functions of the first server 206 may be implemented on a dedicated computing device (such as apparatus 680), or may be implemented on a computing device (such as apparatus 680) arranged to implement further functions in addition to the functions of the first server 206 described, and/or may be implemented on a plurality, for example a distributed plurality, of computing devices (such as apparatus 680), but which may nonetheless constitute the first server 206. In some examples, the same may apply to the second server 212, 214.

In some examples, the first server 206 and the second server 212, 214 may constitute a system for processing data in a network 200.

Although in some of the examples described above there is only one first server of one MNO 202, it will be appreciated that the methods described herein may be applicable to data processing in networks having more than one MNO 202. For example, in some examples (not illustrated), the network 200 may comprise a further first server (not shown). The further first server may be part of a further MNO network (not shown). The further first server (not shown) may have access to a further first data store such as a first database (not shown). The further first database (not shown) may store further first data (e.g. subscriber data of the subscribers of the further MNO) according to a further first predefined format. In these examples, the method may comprise, at the second server 206: receiving, from the further first server (not shown), further first information (i.e. a further Writer Schema) characterising the further first predefined format according to which the further first data is stored at the further first database (not shown). In some examples, the method may comprise obtaining, at the second server, mapping information characterising a mapping of the further first predefined format onto the second predefined format. In some examples, the mapping information may be the same mapping information as obtained for the first information, or may be updated mapping information updated based on the further first information, for example. The method may comprise generating, based on the further first information and the mapping information (which may be the same as, generated based on, or different to the mapping information used for generating the second information), further second information (i.e. a further Reader Schema) for converting data in the further first predefined format into data in the second predefined format; and transmitting, to the further first server (not shown), the further second information (i.e. the further Reader Shema) for the further first server (not shown) to use to parse the further first data stored at the further first database (not shown) to generate data in the second predefined format. Similar functions as those described for the first server 206 may then be applied at the further first server (not shown). This process may be applied for multiple further MNOs (not shown).

Although in the above examples, the service provider is a Mobile network Operator, it will be appreciated that this need not necessarily be the case and that in some examples the service provider may be any other service provider, such as an Internet Service Provider. It will also be appreciated that in some examples, the service provider may be a service provider (e.g. a financial institution or the like) which may not necessarily itself implement the service provider network but may nonetheless utilise the service provider network, for example to facilitate communications with its subscribers.

Although in the above examples, the first server is described as a server of a service provider and the data in the first predefined format is subscriber data, it will be appreciated that this need not necessarily be the case and that in other examples, the methodology described herein may be applied to other applications in which data is stored in a first predefined format in a first data store to which the first server has access, but where it is desired that the data be converted into a second predefined format at the first server where that second predefined format is specified remotely from the first server by a second server that, for example, does not have access to the first data store.

Although some of the above examples refer to information, for example the second information (e.g. the Reader Schema) and/or the segmentation information (e.g. the DUP), being fetched from the second server by the first server, it will be appreciated that this need not necessarily be the case and that in other examples information such as the second information (e.g. the Reader Schema) and/or the segmentation information (e.g. the DUP) may be transmitted in any suitable way, for example by being pushed from the second server to the first server. Similarly, although some of the above examples refer to information, for example the first information (e.g. the Writer Schema), being pushed from the first server to the second server, it will be appreciated that this need not necessarily be the case and that in other examples information, such as the first information (e.g. the Writer Schema), may be transmitted in any suitable way, for example by being fetched from the first server by the second server.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of processing data in a network, the network comprising a first server and a second server, the first server having access to a first data store storing first data according to a first predefined format, the method comprising:
   transmitting, from the first server to the second server, first information characterising the first predefined format according to which the first data is stored at the first data store;
   obtaining, at the second server, mapping information characterising a mapping of the first predefined format onto a second predefined format different from the first predefined format;
   generating, at the second server, based on the first information and the mapping information, second information for converting data in the first predefined format into data in the second predefined format;
   transmitting, from the second server to the first server, the second information; and
   parsing, at the first server, using the second information, the first data stored at the first data store, to generate data in the second predefined format;
   wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

2. The method according to claim 1, wherein the method comprises, when the first information is updated at the first server and/or the mapping information is updated at the second server:
   transmitting, from the first server to the second server, the updated information and/or obtaining the updated mapping information;
   generating updated second information based on the updated first information and/or the updated mapping information;
   transmitting, from the second server to the first server, the updated second information; and
   parsing, at the first server, using the updated second information, the first data stored at the first data store, to generate data in an updated second predefined format.

3. The method according to claim 1, wherein the transmitting, from the second server to the first server, the second information or updated second information, comprises the first server fetching the second information from second server.

4. The method according to claim 1, wherein the first information further characterises a selected range of the first plurality of attributes, wherein the generated second information comprises said second information corresponding to the selected range of the first plurality of attributes, and wherein the parsing comprises parsing the first data corresponding to the selected range of first attributes, to generate the data in the second predefined format.

5. The method according to claim 1, wherein the method further comprises:
   obtaining, at the second server, segmentation information characterising one or more second attribute values on the basis of which the data in the second predefined format is to be segmented;
   transmitting, from the second server to the first server, the segmentation information; and
   at the first server, segmenting the data in the second predefined format based on the segmentation information, thereby to produce a segmentation output.

6. The method according to claim 5, wherein transmitting the segmentation information from the second server to the first server comprises the first server fetching the segmentation information from the second server.

7. The method according to claim 5, wherein the method comprises, when the segmentation information is updated at the second server:
   obtaining, at the second server, the updated segmentation information;
   transmitting, from the second server to the first server, the updated segmentation information; and
   at the first server, segmenting the data in the second predefined format based on the updated segmentation information, thereby to produce an updated segmentation output.

8. The method according to claim 5, wherein the method comprises transmitting, from the first server, the segmentation output to a third server for the third server to use in modifying one or more messages received at the third server.

9. The method according to claim 8, wherein the method comprises, at the third server, modifying a message based on the segmentation output.

10. The method according to claim 9, wherein the modifying comprises including a content identifier into the message, the content identifier identifying content to be delivered in response to the message.

11. The method according to claim 9, wherein the third server is an Internet Content Adaption Protocol, ICAP, Server.

12. The method according to claim 1, wherein the first server and the first data store are located within a secure network and the second server is external to the secure network and does not have access to the first data store.

13. The method according to claim 12, wherein the secure network is a secure network of a mobile network operator.

14. A system for processing data in a network, the system comprising a first server and a second server, the first server having access to a data store storing first data according to a first predefined format, the system being configured to:
   transmit, from the first server to the second server, first information characterising the first predefined format according to which the first data is stored at the first data store;
   obtain, at the second server, mapping information characterising a mapping of the first predefined format onto a second predefined format different from the first predefined format;
   generate, at the second server, based on the first information and the mapping information, second information for converting data in the first predefined format into data in the second predefined format;
   transmit, from the second server to the first server, the second information; and
   parse, at the first server, using the second information, the first data stored at the first data store, to generate data in the second predefined format;
   wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

15. A method of processing data in a network, the network comprising a first server and a second server, the first server having access to a first data store storing first data according to a first predefined format, the method comprising, at the first server:
   transmitting, to the second server, first information characterising the first predefined format according to which the first data is stored at the first data store;
   receiving, from the second server, second information for converting data in the first predefined format into data in a second predefined format different from the first predefined format, the second information having been generated at the second server based on the first information transmitted to the second server and mapping information characterising a mapping of the first predefined format onto the second predefined format; and
   parsing, using the second information, the first data stored at the first data store, to generate data in the second predefined format;
   wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

16. A method of processing data in a network, the network comprising a first server and a second server, the first server having access to a first data store storing first data according to a first predefined format, the method comprising, at the second server:
   receiving, from the first server, first information characterising the first predefined format according to which the first data is stored at the first data store;
   obtaining mapping information characterising a mapping of the first predefined format onto a second predefined format different from the first predefined format;
   generating, based on the first information and the mapping information, second information for converting data in the first predefined format into data in the second predefined format;

transmitting, to the first server, the second information for the first server to use to parse the first data stored at the first data store to generate data in the second predefined format;

wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

17. The method according to claim 16, wherein the network comprises a further first server, the further first server having access to a further first data store, the further first data store storing further first data according to a further first predefined format; wherein the method comprises, at the second server:

receiving, from the further first server, further first information characterising the further first predefined format according to which the further first data is stored at the further first data store;

generating, based on the further first information and the mapping information and/or further mapping information generated on the basis of the further first information, further second information for converting data in the further first predefined format into data in the second predefined format;

transmitting, to the further first server, the further second information for the further first server to use to parse the further first data stored at the further first data store to generate data in the second predefined format.

18. Apparatus for processing data in a network, the apparatus being a first server of the network, the network further comprising a second server, the first server having access to a first data store storing first data according to a first predefined format, the apparatus being configured to:

transmit, to the second server, first information characterising the first predefined format according to which the first data is stored at the first data store;

receive, from the second server, second information for converting data in the first predefined format into data in a second predefined format different from the first predefined format, the second information having been generated at the second server based on the first information transmitted to the second server and mapping information characterising a mapping of the first predefined format onto the second predefined format; and parse, using the second information, the first data stored at the first data store, to generate data in the second predefined format;

wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

19. Apparatus for processing data in a network, the apparatus being a second server of the network, the network further comprising a first server, the first server having access to a first data store storing first data according to a first predefined format, the second server being configured to:

receive, from the first server, first information characterising the first predefined format according to which the first data is stored at the first data store;

obtain mapping information characterising a mapping of the first predefined format onto a second predefined format different to the first predefined format; generate, based on the first information and the mapping information, second information for converting data in the first predefined format into data in the second predefined format;

transmit, to the first server, the second information for the first server to use to parse the first data stored at the first data store to generate data in the second predefined format;

wherein the first predefined format comprises a first plurality of attributes each associated with first attribute values, and the second predefined format comprises a second plurality of attributes each associated with second attribute values, and wherein the mapping information comprises information characterising a mapping of the first plurality of attributes onto the second plurality of attributes and/or a mapping of the first attribute values onto the second attribute values.

* * * * *